United States Patent [19]
Genero et al.

[11] Patent Number: 5,678,284
[45] Date of Patent: Oct. 21, 1997

[54] DEVICE FOR RELEASABLY ENGAGING AN OBJECT

[76] Inventors: Claude Paul Genero; Gail Ann Genero, both of 30 Phillips Street, Dianella, Western Australia 6062, Australia

[21] Appl. No.: 462,150

[22] Filed: Jun. 5, 1995

Related U.S. Application Data

[62] Division of Ser. No. 50,310, filed as PCT/AU91/00528, Nov. 20, 1991, Pat. No. 5,446,948.

[30] Foreign Application Priority Data

Nov. 20, 1990 [AU] Australia .................. PK3426
Mar. 5, 1991 [AU] Australia .................. PK4925

[51] Int. Cl.⁶ .................. B25B 5/04; B25B 5/12
[52] U.S. Cl. .................. 24/327; 24/337; 24/495; 24/498
[58] Field of Search .................. 24/704.1, 516, 24/456, 336

[56] References Cited

U.S. PATENT DOCUMENTS

| | | | |
|---|---|---|---|
| 474,537 | 5/1892 | Steele | 24/511 |
| 631,665 | 8/1899 | Potter | 24/511 X |
| 3,700,206 | 10/1972 | Jones | 24/704.1 X |
| 4,878,276 | 11/1989 | Morrish et al. | 24/511 |
| 5,279,505 | 1/1994 | Goudreau et al. | 24/704.1 X |
| 5,446,948 | 9/1995 | Genero et al. | 24/327 |

FOREIGN PATENT DOCUMENTS

| | | |
|---|---|---|
| 1212248 | 11/1970 | United Kingdom . |
| 2029498 | 3/1980 | United Kingdom . |
| 2195694 | 4/1988 | United Kingdom . |

*Primary Examiner*—Richard E. Gluck

[57] ABSTRACT

An engaging device for releasably engaging an object. The engaging device comprises a supporting part and an engaging part mounted on the supporting part for pivotal movement about two spaced apart pivot axes between two stable conditions one being an engaging condition and the other being a release condition. The engaging part comprises two spaced apart arm portions and an elongated bridge portion extending between the arm portions, and means for causing the engaging part to in use remain in the engaging condition in response to the application of a pulling force between the object and the engaging device.

80 Claims, 6 Drawing Sheets

DEVICE FOR RELEASABLY ENGAGING AN OBJECT

RELATED APPLICATION

This application is a division of U.S. application Ser. No. 08/050,310 filed May 11, 1993, now U.S. Pat. No. 5,446, 948, being a National Phase entry of International Application Number PCT/AU91/00528 filed Nov. 20, 1991.

BACKGROUND OF THE INVENTION

THIS INVENTION relates to an engaging device for releasably engaging an object. More particularly, the invention relates to an engaging device which can readily engage an object but which does not so readily release the object.

The engaging device may find application in various fields where it is necessary to releasably engage an object in a simple yet effective manner.

There are various engaging devices which move between engaging and release conditions by way of a snap-action process. Typical of such devices is an articulable article which is described and illustrated in GB 1212248 (Westhem) and which is well adapted for use as a clipping or gripping device. The articulated article, when functioning as a gripping device, comprises first and second swingable members movable between closed (engaging) and an open (release) positions. The swingable members are mounted on a resiliently bendable support structure comprising two upright members, the first swingable member being hingedly joined to one of the upright members through a flexible web constituting a first hinge line and the second swingable member being hingedly joined to the other of the upright members through a further flexible web constituting a second hinge line. The first and second swingable members are hingedly joined together through a third hinge line. The resiliently bendable characteristic of the support structure is provided by at least one of the upright members being resiliently bendable so allowing the two swingable members to swing respectively about the first and second hinge lines between the open and closed positions. In moving between the open and closed positions, the swingable members move through an unstable "over-toggling" position in which the three hinge lines are in alignment, and the resiliently bendable support structure deflects outwardly to accommodate this movement. As the support structure deflects outwardly, its resilient nature influences the swingable members and produces the snap-action between the open and closed positions.

Somewhat similar engaging devices are disclosed in U.S. Pat. No. 4,071,930 (Tanaka), U.S. Pat. No. 4,240,604 (Brach) and U.S. Pat. No. 4,514,885 (Delahousse).

A further engaging device is disclosed in our co-pending U.S. patent application Ser. No. 08/050,310, the contents of which are incorporated herein by way of reference and from which the present application has been divided.

In the engaging devices referred to above, including some (but not all) of the embodiments of U.S. Pat. application Ser. No. 08/050,310, the devices are so constructed that they engage and disengage objects with substantially the same ease.

It would be advantageous to provide an engaging device which can readily engage an object but which does not at least so readily release the object.

The present invention seeks to provide such an engaging device.

SUMMARY OF THE INVENTION

In one form, the invention resides in an engaging device for engaging an object, the engaging device comprising a supporting part, an engaging part mounted on the supporting part for pivotal movement about two spaced apart pivot axes between two conditions one which is an engaging condition, the engaging part comprising engaging means and a bridge portion, said bridge portion extending between said pivot axes, and means associated with the bridge portion for causing the engaging part to lock in the engaging condition upon an attempt being made to disengage the object from the engaging means.

The means may comprise a weakening means in the engaging part. The weakening means may be created by a notch in the engaging part. The weakening means may be of resilient construction.

The weakening means may comprise a weakening which may be provided at or near the junction between the bridge portion and the engaging means.

Preferably, the supporting part comprises a housing accommodating said engaging part. The housing preferably has a recess for receiving said object whereby the object is releasably retained in said recess when the engaging part is co-operating with said recess. With this construction, the engaging means preferably extends into said recess when the engaging part is in the engaging condition and the bridge portion extends into the recess when the engaging part is in the other of the two conditions being a release condition.

The feature of the recess co-operating with the engaging part to releasably engage the object is particularly useful as the inner edge of the recess can isolate the bridge portion from the object when the engaging part is in the engaging condition. In this way it is not necessary for the bridge portion to have sufficient strength and rigidity to support the object.

In another arrangement, the means comprises an arrangement in which the bridge portion is asymmetric in relation to a line extending between the two axes when the engaging part is in the two stable conditions such that the bridge portion is closer to said line when in one of the stable conditions than when in the other of the stable conditions.

A control means may be provided for selectively moving the engaging part between the two stable conditions, or at least from the engaging condition to the release condition.

In another form, the invention resides in an engaging device for releasably engaging an object, the engaging device comprising a supporting part, an engaging part mounted on the supporting part for pivotal movement about two spaced apart pivot axes between two stable conditions one being an engaging condition and the other being a release condition, the engaging part comprising engaging means and a bridge portion, said bridge portion extending between said pivot axes, wherein the engaging part moves into the release condition only when a force is being applied to the bridge portion.

In another form, the invention resides in an engaging device for engaging an object, the engaging device comprising a supporting part, an engaging part mounted on the supporting part for pivotal movement about two spaced apart pivot axes between two conditions one of which is an engaging condition, the engaging part comprising engaging means and a bridge portion, said bridge portion extending between said pivot axes, and a weakening means provided in the engaging part for causing the engaging part to remain in the engaging condition upon an attempt being made to disengage the object from the engaging means.

In still another form, the invention resides in an engaging device for releasably engaging an object, the engaging device comprising a supporting part, an engaging part mounted on the supporting part for pivotal movement about two spaced apart pivot axes between two stable conditions one being an engaging condition and the other being a release condition, the engaging part comprising engaging means and a bridge portion, said bridge portion extending between said pivot axes wherein the engaging part is provided with means for causing at least a portion of the bridge portion to initially deflect away from a line extending between the two pivot axes in response to the application of force to the engaging means when the engaging device is in the engaging condition thereby to at least inhibit movement of the engaging part from the engaging condition to the release condition.

In another form, the invention resides in an engaging device for releasably engaging an object, the engaging device comprising a supporting part, an engaging part mounted on the supporting part for pivotal movement about two spaced apart pivot axes between two stable conditions one being an engaging condition and the other being a release condition, the engaging part comprising engaging means and a bridge portion, said bridge portion extending between said pivot axes, wherein the engaging part is provided with extension means other than said engaging means extending outwardly therefrom and wherein initial contact with the object for the purpose of causing the engaging part to move from the release condition to the engaging condition is made by way of said extension means.

In another form, the invention resides in an engaging device comprising a supporting part, an engaging part mounted on the supporting part for pivotal movement about two spaced apart pivot axes between two conditions one being an engaging condition and the other being a release condition, the engaging part comprising engaging means and a bridge portion, said bridge portion extending between said pivot axes, said engaging means comprising first and second parts, said first part projecting beyond a surface of said bridge portion facing one direction of movement of the bridge portion between the two conditions, said second part projecting beyond an opposed surface of the bridge portion facing another direction of movement between the two conditions, wherein each of first and second part of said engaging means engages a respective object upon application of a contact force of sufficient magnitude to the bridge portion by said object.

In still another form, the invention resides in an engaging device for engaging an object, the engaging device comprising a supporting part, an engaging part mounted on the supporting part for pivotal movement about two spaced apart pivot axes between two stable conditions one being an engaging condition and the other being a release condition, the engaging part comprising engaging means and a bridge portion, said bridge portion extending between said pivot axes, the bridge portion having opposed ends whereby the engaging part is movable from the engaging condition to the release condition by pressing the ends of the bridge portion inwardly towards each other.

In another form, the invention resides in an articulable article comprising a supporting part, a bridge portion mounted on the supporting part for pivotal movement about two spaced apart axes between two positions, said bridge portion comprising two opposed surfaces each of which faces a respective direction in which the bridge portion can move upon movement thereof between said two positions, wherein a portion of the supporting part disposed between the two axes faces a surface of the bridge portion other than said two surfaces thereof, wherein the distance between the two axes when the bridge portion is in either one of the two positions is such as to cause compressive stresses in the bridge portion during movement of said bridge portion between the two positions and wherein said compressive stresses are at their greatest when the bridge portion passes through a line extending between said pivot axes.

The articulable article may comprise an engaging device.

In still another form, the invention resides in an articulable article comprising a supporting part, a bridge portion mounted on the supporting part for pivotal movement about two spaced apart axes between two stable positions, said bridge portion comprising two opposed surfaces each of which faces a respective direction in which the bridge portion can move upon movement thereof between the two stable positions, wherein said axes are defined by means carried on two spaced apart portions of the supporting part, said portions being fixed with respect to each other during movement of the bridge portion between the two stable positions and wherein the distance between the two axes when the bridge portion is in either one of the two stable positions is such as to cause compressive stresses in the bridge portion during movement of said bridge portion between the two stable positions, wherein the bridge portion is urged between the two stable positions upon said application of force to the bridge portion.

In another form, the inventions resides in an engaging device for engaging an object, the engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes, wherein the distance between the two axes when the bridge portion is in either one of the two conditions is such as to cause compressive stresses in the bridge portion during movement of said bridge portion between the two conditions, wherein the bridge portion is urged between the two conditions upon application of a force of sufficient magnitude to the bridge portion, said engaging part being provided with weakening means defined by at least one weakening offset from the centre of the bridge portion.

In another form, the invention resides in an engaging device for engaging an object, the engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes, wherein said engaging means co-operates with said supporting part to engage an object, said bridge portion being exposed for contact with the object when the engaging part is in the release condition whereby said engaging part engages said object upon application of a contact force of sufficient magnitude to the bridge portion by the object.

In another form, the invention resides in an engaging device for releasably engaging an object, the engaging device comprising a supporting part, an engaging part mounted on the supporting part for pivotal movement about two spaced apart pivot axes between two stable conditions one being an engaging condition and the other being a release condition, the engaging part comprising two spaced apart arm portions and a bridge portion, said bridge portion extending between said pivot axes, wherein the application of a pulling force of sufficient magnitude to either one of said two arm portions to cause said one arm portion to deflect away from a line extending between said two axes causes the other one of said two arm portions to at least initially deflect towards said line extending between said two axes.

In still another form, the invention resides in an engaging device for engaging an object, the engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes, wherein said bridge portion is of deflectable construction and wherein said bridge portion comprises two opposed surfaces each of which faces a respective direction in which the bridge portion can move upon movement thereof between said two conditions, wherein the distance between the two axes when the bridge portion is in either one of the two conditions is such as to cause compressive stresses in the bridge portion during movement of said bridge portion between the two conditions and wherein the bridge portion deflects in a direction perpendicular to the direction of movement of the bridge portion when moving from the engaging condition to the release condition upon application of a force of sufficient magnitude to the engaging means.

In still another form, the invention resides in an engaging device for engaging an object, the engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes, wherein said supporting part comprises a housing and at least a portion of said engaging part is accommodated within said housing, and wherein the engaging part is provided with extension means extending beyond said housing whereby the engaging part is movable from the engaging condition to the release condition by manipulation of said extension means.

In still another form, the invention resides in an engaging device for engaging an object, the engaging device comprising a supporting part, an engaging part mounted on the supporting part for pivotal movement about two spaced apart pivot axes between two conditions one of which is an engaging condition, the engaging part comprising engaging means and a bridge portion, said bridge portion extending between said pivot axes, and a weakening means provided in the engaging part, said weakening means being located on a portion of the engaging part other than on that portion of the engaging part disposed between the two axes.

In still another form, the invention resides in an engaging device for engaging an object, the engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes, said bridge portion comprising two opposed surfaces each of which faces a respective direction in which the bridge portion can move upon movement thereof between said two conditions, wherein a portion of the supporting part disposed between the two axes faces a surface of the bridge portion other than said two surfaces thereof, wherein the distance between the two axes when the bridge portion is in either one of the two conditions is such as to cause compressive stresses in the bridge portion during movement of said bridge portion between the two conditions and wherein said compressive stresses are at their greatest when the bridge portion passes through a line extending between said pivot axes.

In still another form, the invention resides in an engaging device for engaging an object, the engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes, said bridge portion comprising two opposed surfaces each of which faces a respective direction in which the bridge portion can move upon movement thereof between the two conditions, wherein said axes are defined by means carried on two spaced apart portions of the supporting part, said portions being fixed with respect to each other during movement of the bridge portion between the two conditions and wherein the distance between the two axes when the bridge portion is in either one of the two conditions is such as to cause compressive stresses in the bridge portion during movement of said bridge portion between the two conditions, wherein the bridge portion is urged between the two conditions upon said application of force to the bridge portion.

In still another form, the invention resides in an engaging device for engaging an object, the engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes, wherein the distance between the two axes when the bridge portion is in either one of the two conditions is such as to cause compressive stresses in the bridge portion during movement of said bridge portion between the two conditions and wherein the bridge portion is urged between the two conditions upon application of a force of sufficient magnitude to the bridge portion, said engaging part being provided with extension means other than said engaging means or part thereof to manipulate said bridge portion from one condition to the other condition.

BRIEF DESCRIPTION OF THE DRAWINGS

The invention will be better understood by reference to the following description of several specific embodiments thereof. The embodiments are directed to an engaging device of the type disclosed in our co-pending U.S. Pat. application Ser. No. 08/050,310 which will be broadly described prior to the description of the embodiments of the present invention in order to provide a better understanding of the present invention. The descriptions will be made with reference to the accompanying drawings in which:

FIG. 18A is a view similar to FIG. 18 with the exception that the engaging device is shown in an engaging condition in which it is in engagement with an object;

FIG. 18B is a side view of FIG. 18A showing the engaging device with the engaging part in a stable position corresponding to either the engaging condition or the release condition of the engaging device.

DETAILED DESCRIPTION OF PREFERRED EMBODIMENTS

Referring now to FIGS. 1 to 7 of the drawings, the engaging device 10 shown therein is according to U.S. patent application Ser. No. 08/050,310 and is adapted to releasably engage an object 11 of rectangular cross-section. The engaging device of this embodiment can engage and release the object simply by pushing it into contact with the object and pulling it out of contact with the object, as will be explained later.

Figure 1:
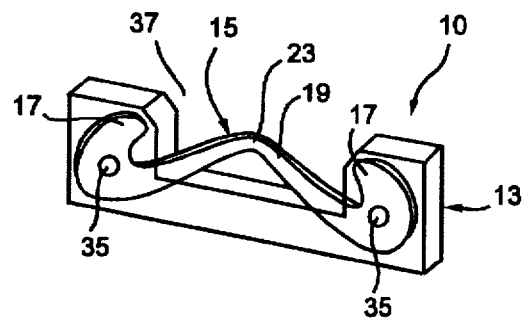
FIG. 1 is a perspective view of one form of engaging device according to U.S. patent application Ser. No. 08/050,310.
Figure 2:
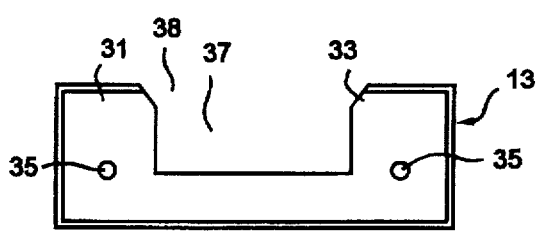
FIG. 2 is a schematic plan view of a supporting part of the engaging device of FIG. 1.
Figure 3:
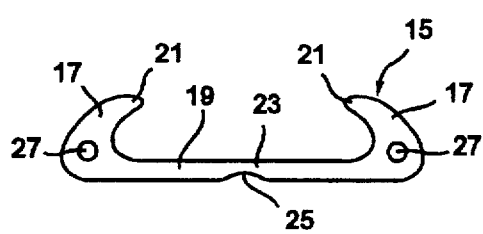
FIG. 3 is a schematic plan view of an engaging part of the engaging device of FIG. 1.
Figure 4:
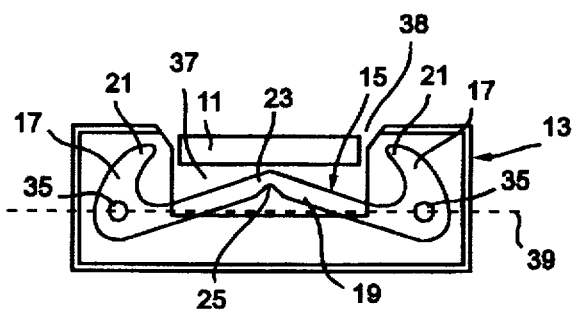
FIG. 4 is a plan view of the engaging device of FIG. 1 shown in a release condition but in readiness to engage an object.
Figure 5:
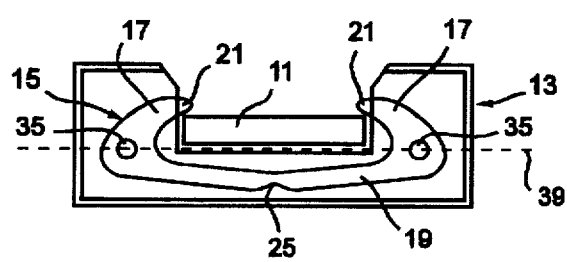
FIG. 5 is a view similar to FIG. 4 with the exception that the engaging device is shown in an engaging condition in which it has engaged the object.

The engaging device 10 comprises a supporting part 13 and an engaging part 15 mounted on the supporting part for movement between two stable conditions, one being an engaging condition (as shown in FIG. 5 of the drawings) in which the engaging device is in engagement with the object 11 and the other being a release condition (as shown in FIG. 4 of the drawings) in which the object 11 can be separated from the engaging device.

The supporting part is constructed of transparent material such as a clear plastics material.

The engaging part 15 comprises a pair of spaced apart arm portions 17 and an elongated bridge portion 19 extending between the arm portions 17. The arm portions 17 are so configured that the free ends thereof define claws 21 which can close around the object 11 when the engaging device is in the engaging condition.

Figure 6:
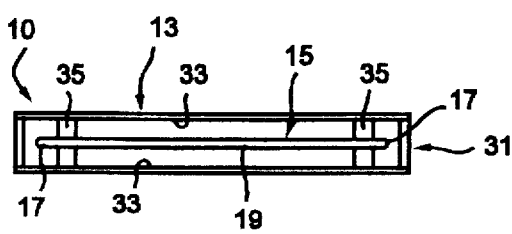
FIG. 6 is a side view showing the engaging device with the engaging part in a stable position corresponding to either the engaging condition or the release condition of the engaging device.
Figure 7:
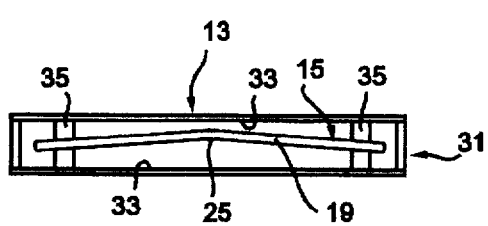
FIG. 7 is a view similar to FIG. 6 with the exception that the engaging part is shown in an unstable condition in which the bridge portion of the engaging part has deflected laterally in a direction generally parallel to the axes about which the engaging part pivots.

The arm portions 17 and the bridge portion 19 are of integral construction and can be formed from a sheet of plastics material which can resiliently bend laterally, such as polypropylene. The integral arm portions and bridge portion can be formed from the sheet material by any suitable process although stamping is particularly appropriate. With this construction, the engaging part is thin in edge profile, as can be seen in FIGS. 6 and 7 of the drawings, and the bridge portion is resiliently bendable laterally. The bridge portion is also constructed to be bendable along its length in a direction generally perpendicular to the lateral direction referred to previously. Such a construction may be achieved by providing the bridge portion with a reduced section 23 which facilitates the bending action. In this embodiment, the reduced section comprises a flexure point 25 formed in the bridge section. The flexure point 25 serves to divide the engaging part 15 into two sections which can bend with respect to each other at the flexure point in the two mutually perpendicular directions, both of which are transverse to the longitudinal axis of the bridge portion.

The engaging part 15 is provided with a pivot hole 27 in each arm portion 17 at a location between the bridge portion and the free end of the arm, the purpose of which will be explained later.

The supporting part 13 comprises a housing 31 having a cavity which accommodates the engaging part 15, the cavity being defined between a pair of spaced apart housing walls 33. A pair of pivot pins 35 extend between, and are rigidly supported at their respective ends on, the housing walls. As the pivot pins 35 are rigidly supported at their ends on the housing walls, they are fixed against movement with respect to each other. The supporting part 13 accommodates the engaging part 15 in the housing 31 with the pivot pins 35 received within the pivot holes 27 in the engaging part. With this arrangement, the pivot pins 35 define pivot axes about which the arm portions 17 can pivot on movement of the engaging part between the engaging and release conditions. This construction results in the walls 33 of the housing being located on opposed sides of the engaging part in a direction along the pivot axes. In other words, the engaging part is located to one side (being the inner side) of each of the housing walls 33 in the direction along the pivot axes such that the engaging part is offset from the housing walls. Furthermore, the pivot pins are supported at locations offset from the engaging part.

A benefit of this construction is that the walls of the housing can be vacuum formed with the pivot pins being formed integrally with one of the walls.

The housing also has a recess 37 for receiving the object 11 to be engaged by the engaging device. The recess 37 opens at 38 onto an edge of the housing. The engaging part is disposed within the housing such that when it is in the engaging condition (as shown in FIG. 5 of the drawings) the claws 21 extend into the recess and the bridge portion is disposed partly or wholly within the confines of the housing. On the other hand, when the engaging part is in the release condition (as shown in FIG. 4 of the drawings) the claws 21 are retracted from the recess and the central region of the bridge portion 19 extends into the recess from the side of the housing opposite the opening at 38.

The bridge portion 19 is movable between two extreme positions, one being a first position corresponding to the engaging condition of the engaging part 15 and the other being a second position corresponding to the released position. The spacing between the pivot pins 35 is fixed and is less than the distance between the pivot holes 27 in the engaging part 15 prior to fitting of the engaging part on the supporting part. Consequently, the bridge portion 19 is in a state of axial compression and undergoes further axial compression as it moves between the two extreme positions. There is an unstable zone between the two extreme positions which results in the bridge portion being urged into one or the other of the two extreme positions. As the bridge portion passes through the unstable zone, it moves through an "over-toggling" or "over-centre" condition in which the flexure point 25 crosses a line 39 (as shown in FIGS. 4 and 5) extending between the pivot axes defined by the pivot pins 35. The unstable condition of the bridge portion 19 arises because the bridge portion is caused to deflect resiliently as it passes through the unstable zone to accommodate movement between the two extreme positions. The resilient deflection occurs about the flexure point 25 with the two sections of the engaging part on opposed sides of the flexure point bending with respect to each other in the two mutually perpendicular directions.

Bending of the bridge portion in one of the mutually perpendicular directions can be seen by reference to FIGS. 6 and 7 of the drawings. In FIG. 6, the bridge portion is shown in a normal (undeflected) condition as is the case when it is at either one of the two extreme positions. In FIG. 7, the bridge portion is shown in a condition where it has undergone bending in the lateral direction. This bending introduces stresses into the bridge portion which urge it to one or the other of extreme positions.

Bending of the bridge portion in the other of the mutually perpendicular directions can be seen by reference to FIGS. 4 and 5 where it is evident that the inclination between the two sections of the bridge portion on opposed sides of the flexure point 25 has changed.

The tendency for the bridge portion to assume one or the other of the extreme positions is manifested as a snapping action whereby the bridge portion snaps from one extreme position to the other extreme position after passing through the unstable zone. This snapping action generates a snapping sound which provides an audible indication that the engaging part has moved between the engaging condition and the release condition.

Once the bridge portion 19 is in one of its extreme positions, it remains in that position until subjected to an external influence. In the present embodiment, the external influence comprises a force of predetermined magnitude applied to the engaging part 15. The necessary force arises as a result of reaction between the engaging part 15 and the object 11 being engaged. This allows the engaging device to be engaged with the object by simply pushing the engaging device and the object together, and to be separated from each other simply by pulling the object and the engaging device apart. Specifically, when it is to be engaged by the engaging device, the object 11 is introduced into the recess 37; at this stage, the engaging part has the claws 21 retracted and the central region of the bridge portion 19 extends into the recess. As the object enters the recess, it contacts, and bears against, the central region of the bridge portion. If the contact force exceeds a predetermined magnitude, the bridge portion is caused to move through the unstable zone and assume the other extreme position in which the claws extend into the recess around the object. In this way, the object is secured to the engaging device. The object is released from the engaging device by retracting the claws 21 and this can be accomplished by applying a pulling force between the object and the engaging device so as to create a reaction between the claws and the object which produces torque on each of the claws of sufficient magnitude to cause the claws to swing and to move the bridge portion 19 through the unstable "over-toggling" position into the other extreme position corresponding to the release condition of the engaging device.

Figure 8:
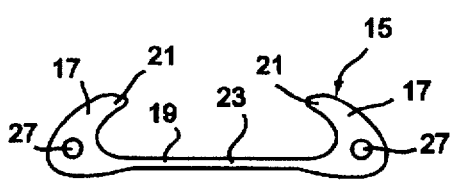
FIG. 8 is a view of a modified form of engaging part which does not utilise a flexure point in the bridge portion to accommodate resilient deflection.

The bending action of the bridge portion 19 as described hereinbefore is accommodated by the flexure point 25. The presence of a flexure point is not, however, essential as the bending action can be accommodated in other ways such as by a suitable narrowing of the bridge portion, as shown in FIG. 8 of the drawings. It is merely necessary for the bridge portion to be of some construction which allows it to bend in two mutually perpendicular directions, with the bending action in the lateral direction being resilient.

Figure 9:
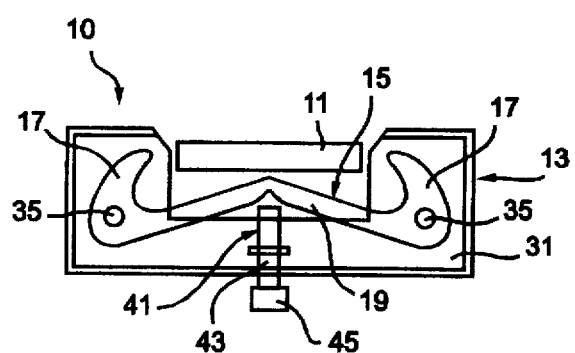
FIG. 9 is a schematic plan view of a further engaging device according to U.S. patent application Ser. No. 08/050,310 in which the device incorporates a control means operable to move the engaging part from the engaging condition to the release condition.

With the engaging devices described hereinbefore, which are in accordance with U.S. patent application Ser. No. 08/050,310, each of the engaging devices was moved from the engaging position to the release position simply by applying a pulling force between the object and the engaging device of sufficient magnitude to cause the arm portions to swing about their pivot axes and thereby cause the bridge portion to move from the first extreme position through the unstable zone into the second extreme position. There may, however, be situations where it is undesirable or inappropriate to have to apply a pulling force between the object and the engaging device to effect release of the object. To accommodate such situations, an engaging device according to the embodiment shown in FIG. 9 of the United States Patent Application is provided with control means 41 for manually operating the engaging device to move the engaging part from the engaging condition to the release condition. The control means 41 comprises a control member 43 mounted for reciprocal movement in the housing 31 for movement towards and away from the bridge portion 19 of the engaging part 15. One end of the control member 43 is engagable with the bridge portion 19 when the latter is in the first extreme position (corresponding to the engaging condition of the engaging device) such that it can push the bridge portion from that position through the unstable zone into the second extreme position. The other end of the control member is exposed for engagement by the user and in this embodiment is provided with a button 45 for such purpose.

There may be situations where it is desirable to ensure that the engaging device cannot be operated to release an object simply by applying pulling forces between the object and the engaging part. Such a need can be met by an engaging device according to the present invention.

Figure 10:
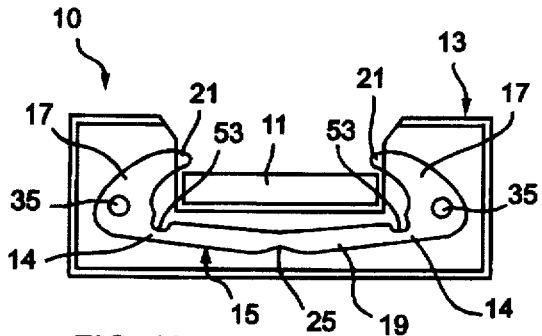
FIG. 10 is a plan view of an engaging device according to a first embodiment of the present inventions, the device being shown in an engaging condition.
Figure 11:
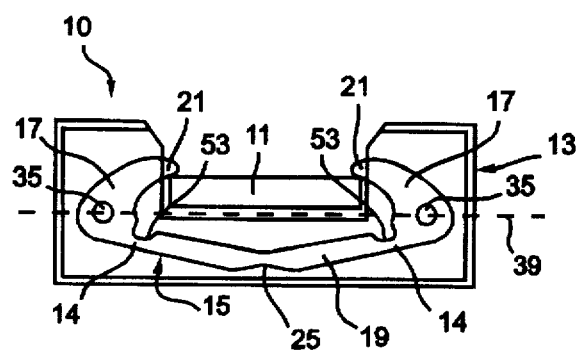
FIG. 11 is a view similar to FIG. 10 with the exception that it illustrates the reaction of the engaging device in circumstances where there is an attempt to release the engaging device from the object being engaged without first moving the engaging part into the release condition.

In the first embodiment of the present invention, which is shown in FIGS. 10 and 11 of the accompanying drawings, the engaging part is provided with a weakening 14 which allows the arm portions to deflect without resulting in movement of the bridge portion from a stable position being occupied. This weakening is achieved by the provision of a notch 53 on the inner edge of the engaging part in the vicinity of the junction between the bridge portion 19 and each arm portion 17. If there is an attempt to detach the object from the engaging device simply by pulling on the object, reaction forces between the object and the engaging part causes the arm portions to deflect about the notches (as shown in FIG. 11 of the drawings) with the result that the bridge portion is caused to deflect away from the line 39 between the two pivot pins 35 rather than towards it, thereby effectively locking the engaging part in the engaging condition. While not shown in the drawings, the engaging device according to this embodiment requires a control means or other system for causing the engaging part to assume the release condition as the engaging part cannot move from the engaging condition to the release condition by the application of force to the arm portions. This arrangement does, however, allow the engaging part to move from a release condition to an engaging position by contact of the object with the bridge portion when the latter extends into the recess.

Where weakenings 14 are provided they may form flexure points for the bridge portion additional to the flexure point 25. The additional flexure points may accommodate some of the resilient deflection of the bridge portion.

Figure 12:
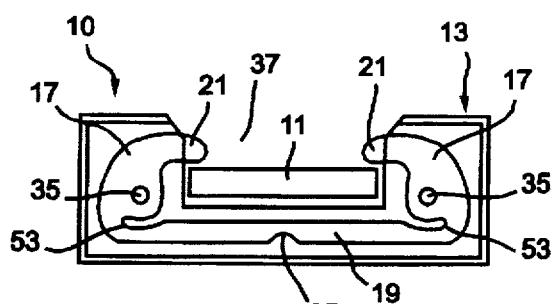
FIG. 12 is a schematic plan view of an engaging device according to another embodiment of the present invention, shown in an engaging condition.
Figure 13:
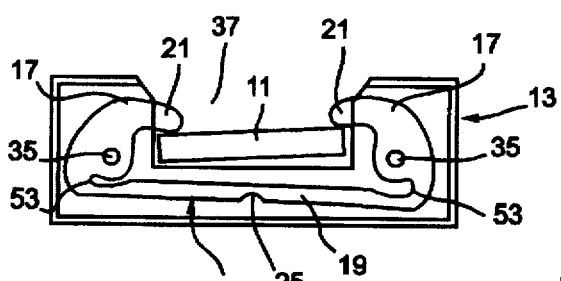
FIG. 13 is a view similar to FIG. 12 with the exception that it illustrates the reaction of the engaging part in circumstances where there is an attempt to release the object from the engaging device without first moving the engaging part into the release condition.

There may be other situations where it is desirable to ensure that the engaging part will only release an object being engaged when the object is pulled from the engaging device along a straight path rather than askew. Such a situation is accommodated by an engaging device according to the second embodiment of the present invention, as shown in FIGS. 12 and 13 of the accompanying drawings. This embodiment is somewhat similar to the first embodiment in the sense that weakenings 14 are provided in the engaging part but in this case the weakenings are so arranged that they allow the engaging part 15 to twist or swing sidewardly about the pivot axes defined by pivot pins 35 (as shown in FIG. 13) when unequal forces are applied to the two arm portions as a result of the object being askew. The sideward swing of the engaging part about the pivot axes occurs instead of the bridge portion being caused to move through the over centre position, and so the engaging part does not move into the release condition. In this way the engaging part is caused to be locked in the engaging condition.

Figure 14:
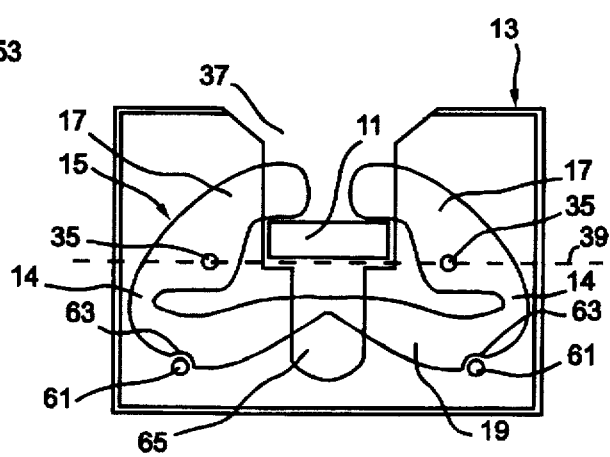
FIG. 14 is a schematic plan view of an engaging device according to still another embodiment.

The embodiment shown in FIG. 14 of the drawings is directed to an engaging device which securely locks the object and resists unintentional releasing of the object even in circumstances where an extreme force is applied to the arm portions by the object. This is achieved by constructing the engaging part so that the bridge portion 19 extends beyond the pivot pins 35 on which the arm portions are mounted. As a result of this arrangement and the configuration of the bridge portion, the latter has a tendency to deflect away from the line 39 extending between the pivot pins rather than towards the line 39 when a pulling force is applied between the object and the engaging device. The supporting part is provided with support pins 61 against which the engaging part bears when in the engaging position, (as shown in the drawing). The support pins provide support for the engaging part to prevent it from deflecting excessively in circumstances where an extreme force is applied to the arm portions by the object 11. The engaging part has notches 63 which receive the pins. In this embodiment, the engaging part is provided with weakenings 14 which comprise a reduction in the thickness of the engaging part at the junction between the bridge portion and each arm portion.

A further feature of the embodiment of FIG. 14 is an aperture 65 provided in the housing 31 to provide access to the underside of the bridge portion 19 so that it can be manipulated manually between its two extreme positions. In this embodiment, the aperture 65 opens onto the inner edge of the recess 37.

Figure 15:
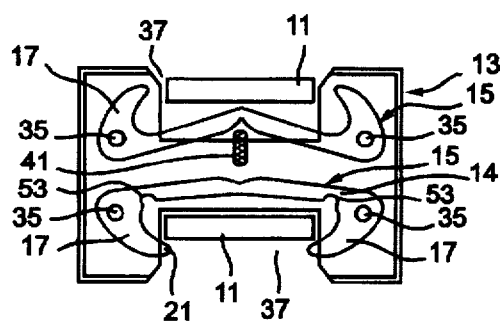
FIG. 15 is a plan view of an engaging device according to still another embodiment incorporating a pair of engaging parts and a control means for selectively moving each of the engaging parts separately from the engaging condition to the release condition.

The embodiment shown in FIG. 15 of the drawings is directed to an engaging device which has two engaging parts, so allowing the device to releasably connect two objects together. Each engaging part can operate independently of the other. One of the engaging parts 15 is provided with weakenings 14 which prevents separation of that engaging part from the object simply by a pulling action. To allow the engaging part to release the object, there is provided a control means 41.

Figure 16:
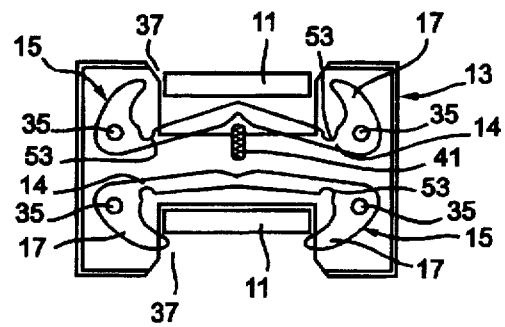
FIG. 16 is a plan view of an engaging device according to another embodiment somewhat similar to the embodiment of FIG. 15.

A variation to the embodiment shown in FIG. 15 is the engaging device shown in FIG. 16 in which each of the engaging parts has weakenings 14 so requiring the control means 41 to be able to operate each engaging part.

In the embodiments of FIGS. 15 and 16 an access opening could be provided as an alternative to the control means 41.

The embodiments of FIGS. 15 and 16 illustrate the two engaging parts operating in a common plane. It will be appreciated, however, that the two engaging parts can be disposed angularly with respect to each other.

Figure 17:
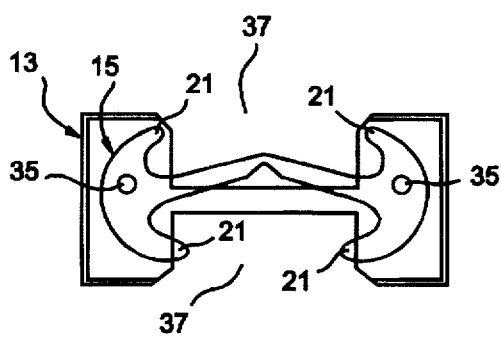
FIG. 17 is a plan view of an engaging device according to still another embodiment in which the engaging part has provision on two sides thereof for engaging an object.

The previous embodiments shown in FIGS. 15 and 16 provide engaging devices which can connect two objects together but they each utilise two engaging parts. An alternative to the two engaging parts is offered by the embodiment shown in FIG. 17 of the drawings where there is only one engaging part but it is provided with two pairs of claws 21. The engaging device according to this embodiment has two recesses 37 in opposed relation in the supporting part and one pair of claws is associated with each recess. The engaging part may have weakenings (provided for example by notches) associated with one, or both, of the pairs of claws in a similar fashion to the earlier embodiments so that at least one of the engaged objects cannot be readily released by applying a pulling force thereto.

Figure 18:
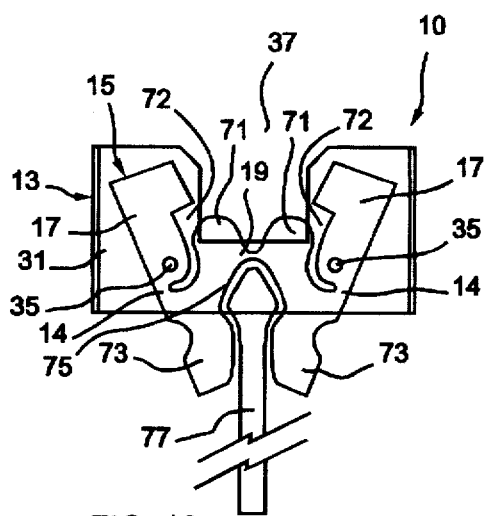
FIG. 18 is a schematic view of an engaging device according to still another embodiment which is adapted for use as a suspension system which can be released from a remote location using an appropriate releasing tool, the engaging device being shown in a release condition.
Figure 18:
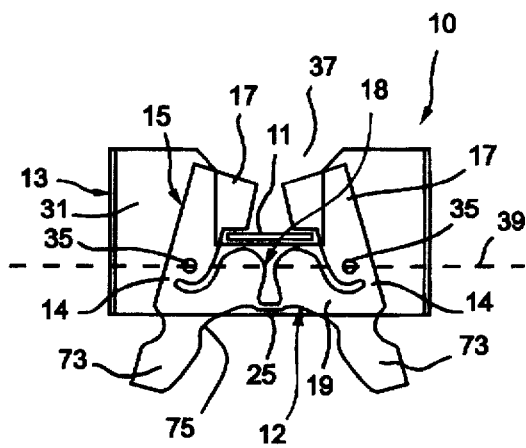
Figure 18:
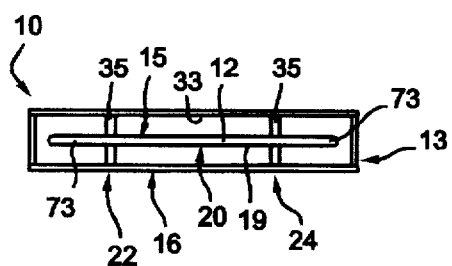

A further embodiment of the engaging device is shown in FIGS. 18, 18A and 18B of the drawings. In this embodiment, the bridge portion 19 has two spaced apart protrusions 71, each of which extends to a location in the vicinity of a respective one of the claws 18 to define a gap 72 therebetween. With this arrangement, the engaging device can engage an object 11 of thin cross-section in the gaps 72. This is because the engaging device can be constructed with the recess having a depth less than that which would be required without the protrusion.

The embodiment also has a pair of rearward extensions 73 provided on the engaging part. The rearward extensions 73 extend beyond the housing 31 and provide a means by which the engaging part can be manipulated manually between the engaging and release conditions.

In this embodiment, the engaging part is provided with weakenings 14 which comprise a reduction in the thickness of the engaging part at the junction between the bridge portion and each arm portion.

A cavity 75 is defined between the rearward extensions 73 and is adapted to receive a tool 77 which can be used to support the engaging device when it is being installed or removed. Additionally, the tool can be used to apply a force to the bridge portion of the engaging part so as to cause it to move from the engaging condition to the release condition. When the engaging part is in the release condition, it embraces the tool so that it is supported on the end of the tool. This allows a user to hold the engaging device by means of the tool from a remote location once the engaging device has been released from the object. This is particularly useful in a situation where the engaging device is being mounted in an elevated location which is not particularly accessible to the user.

In this embodiment the bridge portion 19 comprises two opposed surfaces 12, 18 each of which faces a respective direction in which the bridge portion can move upon movement thereof between the two conditions. With this arrangement a portion of the supporting part 16 disposed between the two axes 35 faces a surface 20 of the bridge portion 19 other than said two surfaces 12, 18 thereof. The distance between the two axes when the bridge portion 19 is in either one of the two conditions is such as to cause compressive stresses in the bridge portion 19 during movement of the bridge portion between the two conditions, said compressive stresses being at their greatest when the bridge portion passes through a line extending between the pivot axes.

As with the earlier embodiments, in this embodiment the engaging part is caused to remain in the engaging condition upon an attempt being made to disengage the object from the engaging device thereby effectively locking the engaging part in the engaging condition.

Figure 19:
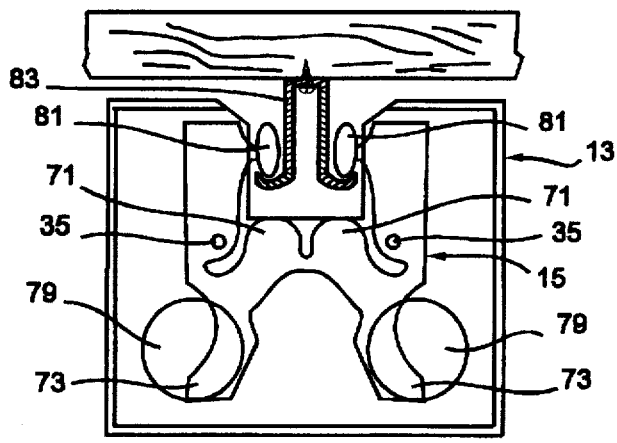
FIG. 19 is an elevational view of an engaging device according to another embodiment adapted to engage a track for movement therealong, the engaging device being shown in the engaging position.
Figure 20:
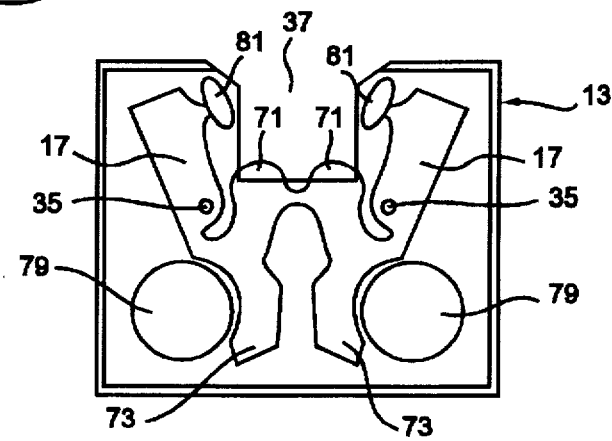
FIG. 20 is a view of the engaging device shown in FIG. 19 with the exception that it is shown in the release condition separated from the track.

The embodiment shown in FIGS. 19 and 20 of the drawings also has two protrusions 71 and rearward extensions 73 similar to the previous embodiment. In this embodiment, however, the rearward extensions 73 do not extend beyond the housing but rather co-operate with openings 79 which are formed in the housing and which provide access to the extensions. This arrangement provides a safety feature in that it ensures that there are no protruding parts which could be accidentally operated to cause the engaging device to release.

Another feature of this embodiment is that the arm portions do not have claws but rather support rollers 81 which can releasably engage a track 83 on movement of the engaging part 15. A particular advantage of this construction is that the engaging device can be fitted onto the track at any position along the length of the track. This arrangement overcomes a disadvantage of many conventional structures which carry rollers for engagement with a track, the disadvantage being that the structure can only be fitted onto the track from the ends of the track or through entry points provided at intervals along the length of the track.

Figure 21:
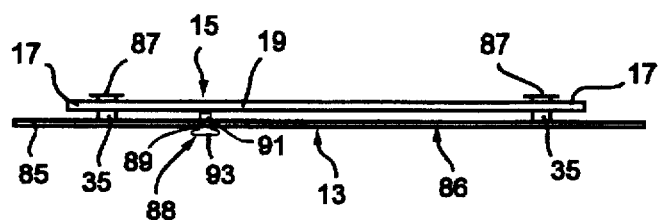
FIG. 21 is a schematic side view of an engaging device according to still another embodiment having stop means to limit the extent of lateral deflection of the engaging part as it moves through an unstable zone between the engaging and release conditions.

In the embodiments described previously, the engaging part 15 is accommodated within the cavity in the housing 31 and the side walls 33 of the housing can serve to limit the extent of lateral deflection of the engaging part as it passes between the two stable positions. An alternative arrangement is shown in FIG. 21 of the drawings where the supporting part 15 simply comprises a plate 85 which carries the pivot pins 35. The free ends of the pivot pins have stops 87 for retaining the engaging part in position. A limiting means 88 is provided for limiting the extent of lateral deflection of the engaging part away from the plate. In this embodiment, the limiting means 88 comprises a pin 89 mounted on the bridge portion 19 of the engaging part and extending through a slot (not shown) formed in the plate. The free end of the pin extends beyond the opposed face 86 of the plate 85 and has a protrusion 93 so dimensioned that it cannot pass through the slot formed in the plate. The protrusion is spaced from the opposed face 86 of the plate to accommodate some lateral deflection of the engaging part but is adapted to move into contact with the opposed face to limit further lateral deflection once the allowable extent of deflection has been achieved.

Figure 22:
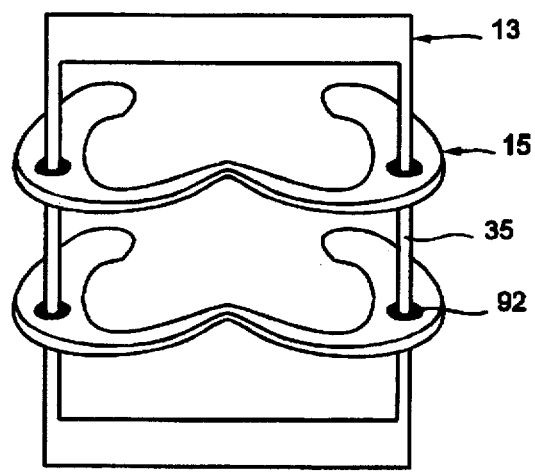
FIG. 22 is a schematic view of an engaging device according to still another embodiment in which there are a plurality of engaging parts mounted on common pivot axis.

The embodiment shown in FIG. 22 of the drawings illustrates an arrangement where the engaging device has a plurality of engaging parts 15 mounted on a common supporting part 13. In this instance, the engaging parts are mounted on common pivot pins 35 and are retained in position by stops 92 on the pivot pins. The arm portions of the engaging parts 15 can be of various sizes and configurations to facilitate gripping of objects of irregular shape. Furthermore, a linking element (not shown) may extend between the various engaging parts so that they can be operated in unison.

Figure 23:
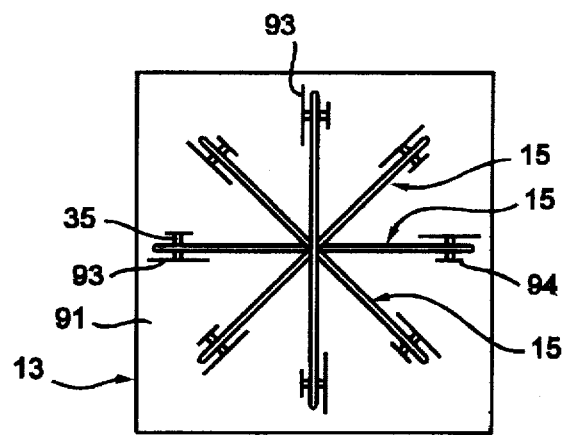
FIG. 23 is a plan view of an engaging device according to still another embodiment for releasably engaging an object in a claw-like fashion.

In FIG. 23 of the drawings there is also illustrated an embodiment in which there are a plurality of engaging parts 15 mounted on a common supporting part 13. In this instance however, the engaging parts do not have common pivot axes but are arranged in angular fashion to provide a claw-like structure which can engage around an object. The various engaging parts 15 contact each other in the central region such that they are caused to move in unison between the engaging and release conditions. At least some, and preferably all, of the engaging parts 15 are provided with weakenings in a similar fashion to the earlier embodiments.

A control means (not shown) may extend through an opening in the plate 91 and be operatively coupled to the engaging parts 15 so that they can be operated remotely. The engaging parts are mounted on pivot pins 35 each of which is supported on one end of a bracket 93. The other end of each pivot pin 35 has a protrusion 94 for retaining the engaging part in position.

The engaging device according to this embodiment is particularly suitable for engaging objects of compact shape such as generally square and spherical objects. In other embodiments, the arm portions of the engaging parts 15 can be of various sizes and configurations to facilitate gripping of objects of irregular shape. This arrangement may find particular application in the area of robotics where items have to be engaged for some form of manipulative process and then released.

Figure 24:
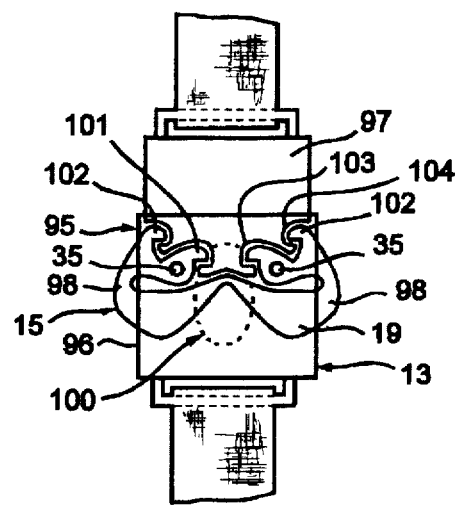
FIG. 24 is a schematic view of an engaging device according to still another embodiment adapted for use in a buckle assembly.

The embodiment shown in FIG. 24 of the drawings is directed to an engaging device suitable for use in a locking device. The locking device is well adapted for use in a buckle assembly 95 comprising first and second parts 96, 97 respectively adapted to be releasably coupled together. The first part 96 incorporates the engaging device according to the embodiment. In this embodiment, the bridge portion 19 extends beyond the pivot pins 35 and also beyond opposed sides of the housing 31. This allows the engaging part to be moved from the engaging condition to the released condition simply by pressing the exposed ends 98 of the bridge portion together. A further feature of the engaging device of this embodiment is that each arm portion has two engaging fingers 101, 102 each adapted to engage in complimentary recesses 103, 104 formed in the second part 97 of the buckle. The engaging fingers 101, 102 of each arm portion extend to opposed sides of the pivot pin 35 on which the arm portion is mounted. As a result of this arrangement, pulling forces between the engaging device and the object do not apply rotational torque to the arm portions but rather are simply transferred to the pivot pins 35. Because no torque is applied to the arm portions, there are no forces exerted on the bridge portion of the engaging part and so locking is achieved. An access opening 100 may also be provided for manual operation of the engaging part.

Figure 25:
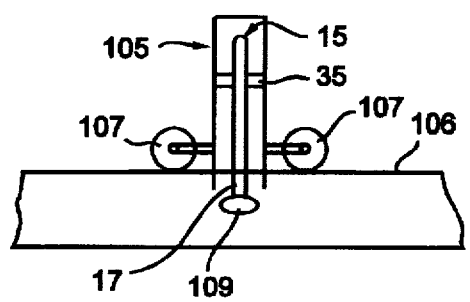
FIG. 25 is a schematic view of an engaging device according to still another embodiment.

The embodiment shown in FIG. 25 is directed to an engaging device incorporated in a mobile structure 105 adapted to travel along a track 106. The mobile structure 105 has wheels 107 for rolling movement along the track 106 and an undercarriage 108 for releasably engaging the underside of the track to retain the mobile structure on the track. The undercarriage comprises the engaging device which has rollers 109 on the arm portions 17 which releasably engage the underside of the track. The mobile structure 105 can be installed on, and removed from, the track 106 at any position along its length simply by moving the engaging device between the engaging and release conditions as appropriate.

Figure 26:
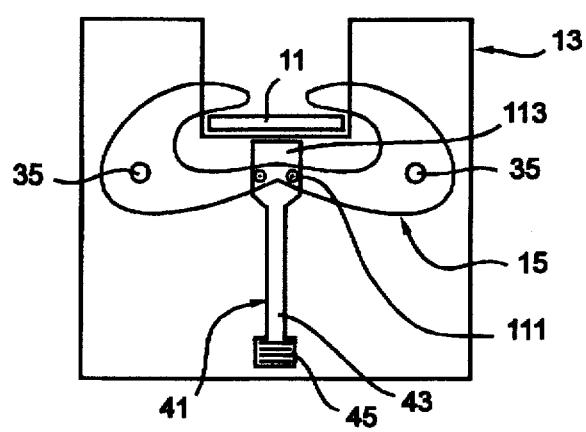
FIG. 26 is a schematic view of an engaging device according to still another embodiment.

Some of the embodiments described earlier have had a control means 41 operable to cause the engaging part to move from the engaging condition to the release condition. In these embodiments, the control means 15 is disposed adjacent to, but not connected to, the engaging part and is movable into engagement with the engaging part to cause the latter to move from the engaging condition to the release condition. The embodiment shown in FIG. 26 of the drawings is somewhat similar in that it is provided with a control means 41 comprising a control member 43 and a button 45 at the free end of the control member. In this embodiment, however, the control member is pivotally connected to the engaging part at pivots 111. The pivots 111 each comprise a pivot pin located on the control member and a pivot hole in the engaging part. The pivot hole is slightly oversized in relation to the pivot pin received therein to accommodate the movement. Furthermore, the control means has an extension 113 which extends beyond the engaging part so that it protrudes into the recess 37 when the engaging part is in the release condition. With this arrangement, an object entering the recess can contact the extension 113 and cause the engaging part to be moved from the release condition to the engaging condition. This arrangement has a further benefit in that the extension 110 functions in a similar manner to the protrusions 71 of the embodiment shown in FIG. 18 of the drawings, so allowing thin objects to be releasably engaged by the device. This is particularly useful as it allows the engaging device to be constructed with the recess 37 not as deep as would be required without the extension.

Figure 27:
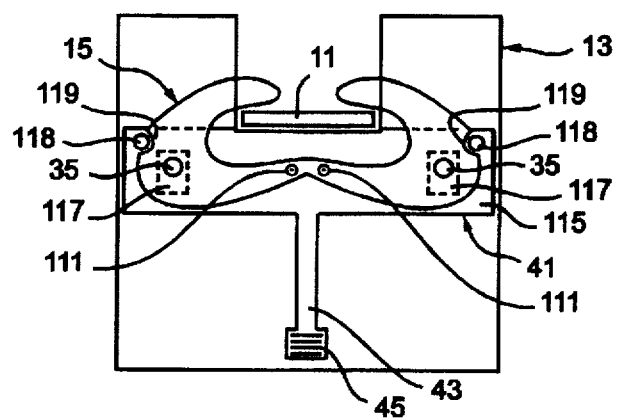
FIG. 27 is a schematic view of yet another embodiment.

The embodiment shown in FIG. 27 is somewhat similar to the immediately preceding embodiment. In this embodiment, however, the control means 41 comprises a slide 115 provided at the inner end of control member 43. The slide 115 is pivotally connected to the engaging part 15 at pivots 111 and is movable reciprocally towards and away from the recess to cause movement of the engaging part between the engaging and release conditions. The slide 115 is provided with slots 117 in which the pivot pins 35 are received to allow the reciprocal movement of the slide. The slide also carries support pins 118 against which the engaging part locates when in the engaging condition, as shown in the drawing. Notches 119 are provided in the engaging part to receive the support pins 118 and this ensures that the engaging device remains locked.

Figure 28:
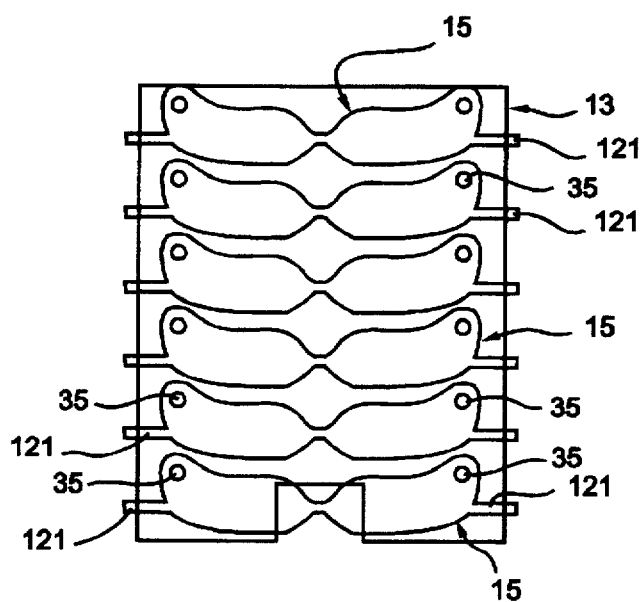
FIG. 28 is a schematic view of an engaging device according to a still further embodiment in which there are a plurality of engaging parts each incorporating engaging pins, the pins being shown in an extended position.
Figure 29:
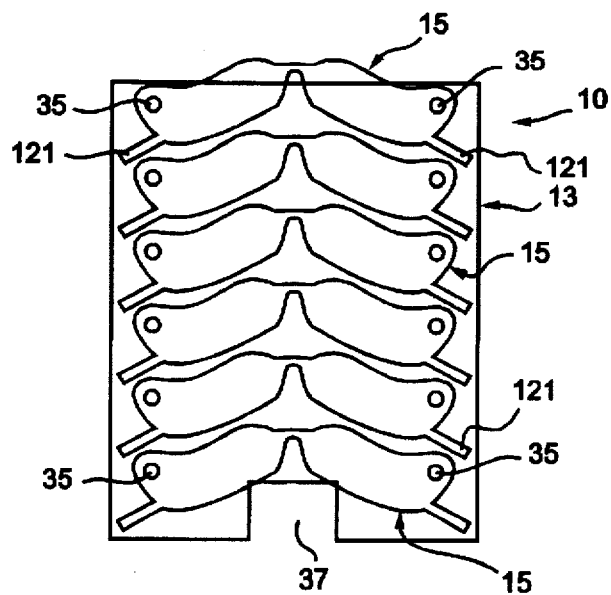
FIG. 29 is a view similar to FIG. 28 with the exception that the engaging device is in a condition where the pins are in a retracted position.

In FIGS. 28 and 29 of the drawings there is illustrated a further embodiment having a plurality of engaging parts 15 mounted on a common supporting part 13. The engaging parts 15 are mounted in a series with each engaging part moving about respective pivot pins 35. The arrangement of the engaging parts in series is such that they are operable in a "domino" fashion in the sense that operation of either one of the engaging parts at the ends of the series causes the remaining engaging parts to operate sequentially. The arm portions of each engaging part is provided with a projection 121 which provides an engaging pin. When the engaging parts are in one of the stable conditions, the engaging pins project sidewardly from the housing 31 (as shown in FIG. 28 of the drawings) and when the engaging parts are in the other stable condition, the engaging pins are disposed within the confines of the housing (as shown in FIG. 29). The engaging pins are arranged to be received in complementary holes formed in an object to which the engaging device is adapted to be releasably secured.

In the foregoing embodiments of the present invention, the respective engaging devices are provided with weakenings in the engaging part for effecting locking of the engaging part in the engaging condition upon an attempt being made to disengage the object from the engaging device. In other embodiments this requirement may be achieved by so constructing the engaging part that the flexure point is asymmetric in relation to the line between the two pivot axes when the engaging part is in the two stable conditions. With this arrangement, the engaging part can be moved from the stable condition in which the flexure point is closer to the line between the two axes. Movement of the engaging part from the stable condition in which the flexure point is farther from the line is resisted, thereby to effectively lock the engaging part in the engaging condition.

In the various embodiments the engaging part has been described as resisting movement from the engaging condition to the release condition. Such resistance may be to the extent of causing the engaging part to remain in the engaging condition in response to the application of pulling forces between the object and the engaging device.

In the various embodiments described, there are features which are described in relation to some embodiments but which are not described and shown as being present in other embodiments. It will be appreciated that such features may, where appropriate, have application to all of the embodiments.

The various embodiments which have been described and illustrated demonstrate that the engaging device according to the invention has a multitude of applications. It should, however, be appreciated that the invention is certainly not limited to the various embodiments described.

What is claimed is:

1. An engaging device for engaging an object, the engaging device comprising a supporting part, an engaging part mounted on the supporting part for pivotal movement about two spaced apart pivot axes between two conditions one of which is an engaging condition, the engaging part comprising engaging means and a bridge portion, said bridge portion extending between said pivot axes, and means associated with the bridge portion for causing the engaging part to lock in the engaging condition upon an attempt being made to disengage the object from the engaging means.

2. An engaging device according to claim 1 wherein the distance between the two axes when the engaging part is in either one of the two conditions is such as to cause compressive stresses in the bridge portion during movement of said engaging part between the two conditions.

3. An engaging device according to claim 1 wherein said means associated with the bridge portion comprises a weakening means in the engaging part.

4. An engaging device according to claim 3 wherein the weakening means is created by a notch in the engaging part.

5. An engaging device according to claim 3 wherein the weakening means is of resilient construction.

6. An engaging device according to claim 3 wherein said engaging means comprises two spaced apart arm portions, each mounted on said supporting part for pivotal movement about a respective one of said pivot axes between a first position corresponding to said engaging condition and a second position corresponding to the other of said two conditions being a release condition.

7. An engaging device according to claim 3 wherein the weakening means comprises a weakening provided at or near the junction between the bridge portion and the engaging means.

8. An engaging device according to claim 6 wherein the weakening means comprises two weakenings, each being provided at or near a junction between the bridge portion and a respective one of the arm portions.

9. An engaging device according to claim 1 wherein the bridge portion deflects away from a line extending between said two axes when a force of sufficient magnitude is applied to the engaging means and wherein the supporting part is provided with support means against which the engaging part bears when in the engaging condition in order to prevent excessive deflection of the engaging part.

10. An engaging device according to claim 1 wherein said supporting part comprises a housing and said engaging part is accommodated within said housing, said housing defining a recess to receive said object, said bridge portion being movable with respect to the recess upon movement of the engaging part between the two conditions, wherein one of said conditions is said engaging condition and the other of said conditions is a release condition and wherein when the engaging part is in the release condition said bridge portion is exposed for contact with said object as the latter enters said recess, said engaging part being adapted to move from said release condition to said engaging condition upon application to the bridge portion of a contact force of sufficient magnitude by the object.

11. An engaging device according to claim 10 wherein said engaging part co-operates with said recess to confine said object within said recess when said engaging part is in said engaging condition.

12. An engaging device according to claim 10 wherein an access opening is provided in said housing for manipulation of the engaging part between the two conditions.

13. An engaging device according to claim 1 wherein said bridge portion extends beyond the two spaced apart pivot axes.

14. An engaging device according to claim 1 wherein the supporting part comprises a support plate.

15. An engaging device according to claim 1 wherein said engaging means extends in one direction and wherein said engaging part is provided with extension means extending in a direction opposed to said one direction, said extension means providing means by which the engaging part can be manipulated between the two conditions.

16. An engaging device according to claim 15 wherein said supporting part comprises a housing and said engaging part is accommodated within said housing and wherein said extension means are disposed within the confines of said housing and an opening means is provided in said housing for access to said extension means.

17. An engaging device according to claim 15 wherein said extension means is adapted to engage a further object.

18. An engaging device according to claim 1 adapted to engage two objects.

19. An engaging device according to claim 18 wherein there are two engaging parts each adapted to engage one of said objects and wherein at least one of the two engaging parts is provided with said means associated with the bridge portion for causing said at least one engaging part to remain in the engaging condition upon an attempt being made to disengage the object from said at least one engaging part.

20. An engaging device according to claim 18 wherein the engaging part is provided with engaging means adapted to engage the objects disposed on opposed sides of a line extending between the two pivot axes.

21. An engaging device according to claim 3 wherein the weakening means is provided in the bridge portion.

22. An engaging device according to claim 1 wherein said supporting part provides access to an inner side of the engaging part for manipulation thereof.

23. An engaging device according to claim 10 wherein the housing comprises a pair of spaced apart housing walls defining therebetween a cavity in which the engaging part is accommodated.

24. An engaging device according to claim 1 wherein said engaging means supports a rolling means for rolling engagement with a track.

25. An engaging device according to claim 1 wherein there is a plurality of said engaging parts mounted on the supporting part.

26. An engaging device according to claim 25 wherein there is a plurality of said engaging parts each being mounted for pivotal movement about said two spaced apart pivot axes.

27. An engaging device according to claim 25 wherein at least some of the engaging parts are mounted for pivotal movement about separate pivot axes whereby the engaging parts provide a claw-like structure for engaging an object.

28. An engaging device according to claim 25 wherein each engaging part comprises a bridge portion, the bridge portions co-operating one with another such that the engaging parts are movable in unison each between the engaging condition and the other of said two conditions being a release condition.

29. An engaging device according to claim 1 wherein said two conditions are stable conditions and wherein said means comprises an arrangement in which the bridge portion is asymmetric in relation to a line extending between the two axes when the engaging part is in the two stable conditions such that the bride portion is closer to said line when in one of the stable conditions than when in the other of the stable conditions.

30. An engaging device according to claim 1 further comprising a control means for selectively moving the engaging part from the engaging condition to the other of said two conditions being a release condition.

31. An engaging device according to claim 30 wherein the control means comprises a control member being operably arranged with respect to the bridge portion for selectively applying a force to the bridge portion to cause movement of the engaging part from the engaging condition to the release condition.

32. An engaging device according to claim 31 wherein the control member is operatively connected to the bridge portion for selectively moving the engaging part between the two conditions.

33. An engaging device according to claim 1 wherein said means comprises a slide against which the engaging part locates when in the engaging condition thereby to lock the engaging part in the engaging condition.

34. An engaging device according to claim 33 wherein there is provided a control member operably arranged with respect to the bridge portion for selectively applying a force to the bridge portion to cause movement of the engaging part between the two conditions and wherein said slide is provided by a portion of the control member.

35. An engaging device according to claim 33 wherein the slide carries means against which the engaging part locates when in the engaging condition thereby to lock the engaging part in the engaging condition.

36. An engaging device for releasably engaging an object, the engaging device comprising a supporting part, an engaging part mounted on the supporting part for pivotal movement about two spaced apart pivot axes between two stable conditions one being an engaging condition and the other being a release condition, the engaging part comprising engaging means and a bridge portion, said bridge portion extending between said pivot axes, wherein the engaging part moves into the release condition only when a force is being applied to the bridge portion.

37. An engaging device according to claim 36 wherein said engaging means comprises two arm portions each provided with two fingers disposed on opposed sides of the pivot axis about which the respective arm portion moves, said fingers being adapted to releasably locate in complementary recesses in the object.

38. An engaging device for engaging an object, the engaging device comprising a supporting part, an engaging part mounted on the supporting part for pivotal movement about two spaced apart pivot axes between two conditions one of which is an engaging condition, the engaging part comprising engaging means and a bridge portion, said bridge portion extending between said pivot axes, and a weakening means provided in the engaging part for causing the engaging part to lock in the engaging condition upon an attempt being made to disengage the object from the engaging means.

39. An engaging device according to claim 38 wherein the weakening means is provided in the bridge portion.

40. An engaging device according to claim 38 wherein said weakening means comprises first and second weakenings in spaced apart arrangement in the engaging part.

41. An engaging device according to claim 40 wherein at least one of said weakenings being at least in part located outside of that portion of the engaging part positioned between the two pivot axes.

42. An engaging device for releasably engaging an object, the engaging device comprising a supporting part, an engaging part mounted on the supporting part for pivotal movement about two spaced apart pivot axes between two stable conditions one being an engaging condition and the other being a release condition, the engaging part comprising engaging means and a bridge portion, said bridge portion extending between said pivot axes wherein the engaging part is provided with means for causing at least a portion of the bridge portion to initially deflect away from a line extending between the two pivot axes in response to the application of a force of sufficient magnitude to the engaging means when the engaging device is in the engaging condition thereby to at least inhibit movement of the engaging part from the engaging condition to the release condition.

43. An engaging device according to claim 42 wherein said means causes said at least a portion of the bridge portion to deflect towards said line after said initial deflection away from said line on further application of said force.

44. An engaging device according to claim 42 wherein said means causes said at least a portion of the bridge portion to continue to deflect further away from said line after said initial deflection on further application of said force thereby causing the engaging part to remain in the engaging condition upon an attempt being made to disengage the object from the engaging means.

45. An engaging device according to claim 42 wherein said means comprises a weakening means in the engaging part.

46. An engaging device for releasably engaging an object, the engaging device comprising a supporting part, an engaging part mounted on the supporting part for pivotal movement about two spaced apart pivot axes between two stable conditions one being an engaging condition and the other being a release condition, the engaging part comprising engaging means and a bridge portion, said bridge portion extending between said pivot axes, wherein the engaging part is provided with extension means other than said engaging means extending outwardly therefrom and wherein initial contact with the object for the purpose of causing the engaging part to move from the release condition to the engaging condition is made by way of said extension means.

47. An engaging device according to claim 46 wherein said extension means comprises two spaced apart protrusions on said bridge portion.

48. An engaging device, according to claim 46 wherein said extension means comprises two spaced apart protrusions on the bridge portion.

49. An engaging device according to claim 46 further comprising a control means for selectively moving the engaging part between the two conditions and wherein said extension means comprises an extension on the control means, said extension extending beyond the bridge portion.

50. An engaging device comprising a supporting part, an engaging part mounted on the supporting part for pivotal movement about two spaced apart pivot axes between two conditions one being an engaging condition and the other being a release condition, the engaging part comprising engaging means and a bridge portion, said bridge portion extending between said pivot axes, said engaging means comprising first and second parts, said first part projecting beyond a surface of said bridge portion facing one direction of movement of the bridge portion between the two conditions, said second part projecting beyond an opposed surface of the bridge portion facing another direction of movement between the two conditions, wherein each of first and second part of said engaging means engages a respective object upon application of a contact force of sufficient magnitude to the bridge portion by said object.

51. An engaging device for engaging an object, the engaging device comprising a supporting part, an engaging part mounted on the supporting part for pivotal movement about two spaced apart pivot axes between two stable conditions one being an engaging condition and the other being a release condition, the engaging part comprising engaging means and a bridge portion, said bridge portion extending between said pivot axes, the bridge portion having opposed ends whereby the engaging part is movable from the engaging condition to the release condition by pressing the ends of the bridge portion inwardly towards each other.

52. An articulable article comprising a supporting part, a bridge portion mounted on the supporting part for pivotal movement about two spaced apart axes between two positions, said bridge portion comprising two opposed surfaces each of which faces a respective direction in which the bridge portion can move upon movement thereof between said two positions, wherein a portion of the supporting part disposed between the two axes faces a surface of the bridge portion other than said two surfaces thereof, wherein the distance between the two axes when the bridge portion is in either one of the two positions is such as to cause compressive stresses in the bridge portion during movement of said bridge portion between the two positions and wherein said compressive stresses are at their greatest when the bridge portion passes through a line extending between said pivot axes.

53. An articulable article according to claim 52 wherein said two positions are stable positions.

54. An articulable article according to claim 53 wherein the bridge portion is urged between the two stable positions upon application of a force of sufficient magnitude to the bridge portion.

55. An articulable article according to claim 52 wherein said bridge portion further comprises projecting means projecting outwardly from said two surfaces whereby said bridge portion moves from one position to the other position upon application of a further force to said projecting means.

56. An articulable article according to claim 55 wherein said projecting means are defined by engaging means for engaging an object and wherein said articulable article moves into one of said two positions being an engaging position in which the engaging means engages said object upon application of a contact force of sufficient magnitude to the bridge portion by the object.

57. An articulable article according to claim 56 wherein said engaging means releasably engages said object and wherein said articulable article moves into the other of said two positions being a release position on the application of a pulling force of sufficient magnitude between the object and said engaging means.

58. An articulable article comprising a supporting part, a bridge portion mounted on the supporting part for pivotal movement about two spaced apart axes between two stable positions, said bridge portion comprising two opposed surfaces each of which faces a respective direction in which the bridge portion can move upon movement thereof between the two stable positions, wherein said axes are defined by means carried on two spaced apart portions of the supporting part, said portions being fixed with respect to each other during movement of the bridge portion between the two stable positions and wherein the distance between the two axes when the bridge portion is in either one of the two stable positions is such as to cause compressive stresses in the bridge portion during movement of said bridge portion between the two stable positions, wherein the bridge portion is urged between the two stable positions upon application of force to the bridge portion.

59. An articulable article according to claim 58 wherein said bridge portion further comprises projecting means projecting outwardly therefrom.

60. An articulable article according to claim 59 wherein said projecting means are defined by engaging means for engaging an object and wherein said articulable article moves into one of said two positions being an engaging position in which the engaging means engages said object upon application of a contact force of sufficient magnitude to the bridge portion by the object.

61. An articulable article according to claim 60 wherein said engaging means releasably engages said object and wherein said articulable article moves into the other of said two positions being a release position on the application of a pulling force between the object and said engaging means.

62. An articulable article according to claim 58 wherein a portion of the supporting part disposed between the two axes faces a surface of the bridge portion other than said two surfaces.

63. An articulable article according to claim 58 wherein the supporting part provides access to said two surfaces of the bridge portion.

64. An articulable article according to claim 59 wherein said projecting means project outwardly beyond said two surfaces of the bridge portion.

65. An engaging device for engaging an object, the engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes, wherein the distance between the two axes when the bridge portion is in either one of the two conditions is such as to cause compressive stresses in the bridge portion during movement of said bridge portion between the two conditions, wherein the bridge portion is urged between the two conditions upon application of a force of sufficient magnitude to the bridge portion, said engaging part being provided with weakening means defined by at least one weakening located closer to one pivot axis than to the other pivot axis.

66. An engaging device according to claim 65 wherein said weakening means is adapted to distort upon the application of a force to said engaging means thereby preventing the engaging part from moving into the release condition until sufficient force is applied to the engaging means.

67. An engaging device for engaging an object, the engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes, wherein said engaging means co-operates with said supporting part to engage an object by in combination on with the other embracing the object, said bridge portion being exposed for contact with the object when the engaging part is in the release condition whereby said engaging part engages said object upon application of a contact force of sufficient magnitude to the bridge portion by the object.

68. An engaging device according to claim 67 wherein said supporting part comprises a housing and said engaging part is accommodated within said housing, said housing defining a recess to receive said object, said bridge portion being movable with respect to the recess and being exposed for contact with said object as said object enters said recess.

69. An engaging device for releasably engaging an object, the engaging device comprising a supporting part, an engaging part mounted on the supporting part for pivotal movement about two spaced apart pivot axes between two stable conditions one being an engaging condition and the other being a release condition, the engaging part comprising two spaced apart arm portions and a bridge portion, said bridge portion extending between said pivot axes, wherein the application of a pulling force of sufficient magnitude to either one of said two arm portions to cause said one arm portion to deflect away from a line extending between said two axes causes the other one of said two arm portions to at least initially deflect towards said line extending between said two axes.

70. An engaging device for engaging an object, the engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes, wherein said bridge portion is of deflectable construction and wherein said bridge portion comprises two opposed surfaces each of which faces a respective direction in which the bridge portion can move upon movement thereof between said two conditions, wherein the distance between the two axes when the bridge portion is in either one of the two conditions is such as to cause compressive stresses in the bridge portion during movement of said bridge portion between the two conditions and wherein the bridge portion deflects in a direction perpendicular to the direction of movement of the bridge portion when moving from the engaging condition to the release condition upon application of a force of sufficient magnitude to the engaging means.

71. An engaging device according to claim 70 wherein the centre section of the bridge portion is as resistant to deflection as at least one other section of said bridge portion.

72. An engaging device according to claim 70 wherein the supporting part is provided with limiting means for limiting the extent of said deflection.

73. An engaging device for engaging an object, the engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes, wherein said supporting part comprises a housing and at least a portion of said engaging part is accommodated within said housing, and wherein the engaging part is provided with extension means extending beyond said housing whereby the engaging part is movable from the engaging condition to the release condition by manipulation of said extension means.

74. An engaging device according to claim 73 wherein said extension means extend beyond opposed sides of said housing.

75. An engaging device for engaging an object, the engaging device comprising a supporting part, an engaging part mounted on the supporting part for pivotal movement about two spaced apart pivot axes between two conditions one of which is an engaging condition, the engaging part comprising engaging means and a bridge portion, said bridge portion extending between said pivot axes, and a weakening means provided in the engaging part, said weakening means being located on a portion of the engaging part outside of the section of that portion of the engaging part disposed between the two axes.

76. An engaging device according to claim 75 wherein said weakening means cause the engaging part to remain in the engaging condition upon an attempt being made to disengage the object from the engaging means.

77. An engaging device according to claim 75 wherein said weakening means comprises first and second weakenings positioned on opposed sides of said two axes outside of the region between the two axes.

78. An engaging device for engaging an object, the engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes, said bridge portion comprising two opposed surfaces each of which faces a respective direction in which the bridge portion can move upon movement thereof between said two conditions, wherein a portion of the supporting part, disposed between the two axes, faces a surface of the bridge portion other than said two surfaces thereof, wherein the distance between the two axes when the bridge portion is in either one of the two conditions is such as to cause compressive stresses in the bridge portion during movement of said bridge portion between the two conditions and wherein said compressive stresses are at their greatest when the bridge portion passes through a line extending between said pivot axes.

79. An engaging device for engaging an object, the engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes, said bridge portion comprising two opposed surfaces each of which faces a respective direction in which the bridge portion can move upon movement thereof between the two conditions, wherein said axes are defined by means carried on two spaced apart portions of the supporting part, said portions being fixed with respect to each other during movement of the bridge portion between the two conditions and wherein the distance between the two axes when the bridge portion is in either one of the two conditions is such as to cause compressive stresses in the bridge portion during movement of said bridge portion between the two conditions, wherein the bridge portion is urged between the two conditions upon application of a force of sufficient magnitude to the bridge portion.

80. An engaging device for engaging an object, the engaging device comprising a supporting part, an engaging part mounted on the supporting part for pivotal movement about two spaced apart axes between two conditions one being an engaging condition and the other being a release condition, the engaging part comprising engaging means and a bridge portion, said bridge portion extending between said axes, wherein the bridge between the two axes when the bridge portion is in either one of the two conditions is such as to cause compressive stresses in the bridge portion during movement of said bridge portion between the two conditions and wherein the bridge portion is urged between the two conditions upon application of a force of sufficient magnitude to the bridge portion, said engaging part being provided with extension means other than said engaging means or part thereof to manipulate said bridge portion from one condition to the other condition.

* * * * *

UNITED STATES PATENT AND TRADEMARK OFFICE
CERTIFICATE OF CORRECTION

PATENT NO. : 5,678,284
DATED : October 21, 1997
INVENTOR(S) : Claude P. Genero; Gail A. Genero It is certified that error appears in the above-indentified patent and that said Letters Patent is hereby corrected as shown below:

Column 2, line 3, after one, insert --of--.

Column 22, line 65, change "on" to read --one--.

Column 24, line 66, change "bridge" to read --distance--.

Signed and Sealed this

Twenty-first Day of April, 1998

Attest:

BRUCE LEHMAN

*Attesting Officer*   *Commissioner of Patents and Trademarks*